(12) United States Patent
Strube

(10) Patent No.: US 6,331,057 B1
(45) Date of Patent: Dec. 18, 2001

(54) MAGNETIC AUXILIARY EYEWEAR CLIP-ON LENSES

(76) Inventor: Karl Strube, Wassergasse 11, A-2500 Baden (AT)

( * ) Notice: Subject to any disclaimer, the term of this patent is extended or adjusted under 35 U.S.C. 154(b) by 0 days.

(21) Appl. No.: 09/748,811

(22) Filed: Dec. 26, 2000

(30) Foreign Application Priority Data

Sep. 15, 2000 (AT) .................................................. 1565-2000

(51) Int. Cl.⁷ .................................................. G02C 9/00
(52) U.S. Cl. .................................................. 351/47; 351/57
(58) Field of Search .................................................. 351/47, 48, 44, 351/57, 58, 41, 110

(56) References Cited

U.S. PATENT DOCUMENTS

| | | |
|---|---|---|
| 5,940,162 | 8/1999 | Wong . |
| 6,092,896 | 7/2000 | Chao et al. . |
| 6,132,040 | 10/2000 | Xiao . |
| 6,139,142 | 10/2000 | Zelman . |
| 6,149,269 | 11/2000 | Madison . |
| 6,206,519 * | 3/2001 | Lin .................................................. 351/47 |

FOREIGN PATENT DOCUMENTS

3054606 * 9/1998 (JP) .................................................. 351/47

OTHER PUBLICATIONS

International Patent Application No. 00/33124 (Mauch), dated Jun. 8, 2000.
International Patent Application No. 00/26718 (Zelman), dated May 11, 2000.

* cited by examiner

*Primary Examiner*—Hung Xuan Dang
(74) *Attorney, Agent, or Firm*—Herbert L. Lerner; Laurence A. Greenberg; Werner H. Stemer

(57) ABSTRACT

The eyewear article has a rimless clip-on which converts regular optical eyeglasses into sunglasses. The clip-on is held by magnets which are disposed in a bridge between its shade lenses. The magnets are very small, round magnet cylinders which are pressed into bores (throughholes or blind bores) in the bridge. The optical eyeglasses have the counter magnets aligned with the magnets in the clip-on. The bores are inclined so as to further increase the holding force of the assembly. In addition, there may be provided a nose on the clip-on bridge which engages into a recess in the bridge assembly of the eyeglasses.

14 Claims, 5 Drawing Sheets

MAGNETIC AUXILIARY EYEWEAR CLIP-ON LENSES

BACKGROUND OF THE INVENTION

1. Field of the Invention

The invention relates to eyewear. More specifically, the invention relates to clip-on attachment lenses for eyeglasses. Such clip-ons are typically shades that convert regular eyeglasses to sunglasses.

2. Description of the Related Art

Clip-on lenses are currently very popular. The prior art knows such clip-ons that are held mechanically on the conventional eyeglasses with clip brackets, for example. Newer clip-on designs allow the attachment to be held on the regular eyeglass frame by way of magnets.

U.S. Pat. No. 6,149,269 to Madison, for example, discloses an assembly wherein a magnet is incorporated in a lateral end piece of an eyeglass frame. The lateral end piece is the structure at which a temple piece is attached, typically in articulating fashion. Madison discloses a variety of attachment mechanisms, each present in a variety of combinations. In one embodiment, for instance, the magnetic holding force provided by the magnets in the end pieces of the eyeglass frame and the clip-on frame respectively, is augmented by a mechanical locking force provided by a bracket which retains the clip-ons on the eyeglass frame. The bracket is attached to the clip-on above the magnetic lateral extension and, when the clip-on is placed on the eyeglasses, the bracket reaches behind the end piece of the eyeglass frame.

U.S. Pat. No. 6,132,040 to Xiao discloses a similar system in which a magnet is incorporated in each lateral end piece on the frame of the eyeglasses and of the clip-ons. The end pieces of the two frames are configured such that, upon being placed in position, the end pieces of the clip-ons reach behind the respective end pieces of the eyeglass frame to hold the clip-on in place with the magnetic force provided by the magnets and with a mechanical force provided by the end pieces.

U.S. Pat. No. 6,139,142 to Zelman discloses a similar structure. In one embodiment, the patent discloses an assembly in which the magnets are incorporated in the bridges of the eyeglass frame and the clip-on frame, respectively. In addition, the clip-on is provided with top brackets which hold the clip-on frames in place on the eyeglasses.

These foregoing disclosures are representative of the state of the art in which the eyeglasses and the clip-on attachments have a full frame. Some modern designs of eyeglasses, however, do not have a full frame. In frameless eyeglasses, the lenses are held in place only by the bridge. The lateral end pieces, and the articulated temple pieces, are laterally attached to the eyeglass lenses without a direct attachment to the bridge, i.e., the bridge and the end pieces are connected only via the lenses themselves. In so-called half-frames, the bridge is connected to the lateral end pieces via an upper frame. Clip-ons for frameless eyewear require only the bridge to hold the two lenses to one another. In this context, it has not been possible to provide magnetic clip-ons for frameless eyeglasses, that is for clip-ons which do not have a frame.

Also, the prior art systems are quite bulky and they require proper alignment of the mechanical and magnetic attachment members. In other words, when the clip-ons or the eyeglass frames are only slightly bent, their easy and secure attachment is no longer assured.

SUMMARY OF THE INVENTION

It is accordingly an object of the invention to provide a magnetic auxiliary clip-on lens assembly, which overcomes the above-mentioned disadvantages of the heretofore-known devices and methods of this general type and which provides for rimless magnetic clip-ons and which renders clip-ons that can still be securely attached even if they are bent and distorted to some degree.

With the foregoing and other objects in view there is provided, in accordance with the invention, a magnetic clip-on attachment, comprising:

first and second lenses;

a clip-on bridge connecting and rigidly holding the first and second lenses in a spaced-apart relationship substantially without a frame; and a magnet disposed to magnetically attach the clip-on bridge to the bridge assembly of the pair of eyeglasses.

The expression "substantially without a frame" here should be understood that there is not provided a rim that encases the lenses. It is not to exclude a partial frame which encases the lenses along, say, up to 20% of the circumference of the lenses.

In accordance with an added feature of the invention, the clip-on bridge is formed with two U-shaped lateral brackets. The brackets each receive and hold a respective one of the first and second lenses.

In accordance with an additional feature of the invention, there are provided two magnets disposed and magnetically aligned in the clip-on bridge to be aligned with and magnetically attracted to two magnets disposed in the bridge assembly of the pair of eyeglasses.

In accordance with another feature of the invention, the clip-on bridge is formed with two cylindrical bores (blind bores or through-holes) and the magnets are cylindrical magnets disposed in the bores. In a preferred embodiment, the blind bores have mutually non-parallel axes.

In accordance with a further feature of the invention, the clip-on bridge is generally aligned horizontally upon being placed on the bridge assembly of the pair of eyeglasses, and the bores have axes offset from vertical by an angle of between 1° and 30°. Preferably, the offset of the axes is between 10° and 15° and the two axes point towards one another, i.e., the axes intersect vertically below the clip-on bridge.

With the above and other objects in view there is also provide, in accordance with the invention, an eyewear article, comprising:

a pair of eyeglasses having first and second lenses, a bridge assembly between the optical lenses, and temple pieces laterally attached to the lenses respectively opposite from the bridge assembly;

a magnetic clip-on attachment having first and second clip-on lenses, a clip-on bridge connecting the first and second clip-on lenses in a spaced-apart relationship substantially without a frame; and magnet devices respectively disposed to magnetically attach the clip-on bridge to the bridge assembly of the pair of eyeglasses and to thereby hold the first and second clip-on lenses in a congruent covering relationship with the first and second lenses, respectively, of the pair of eyeglasses.

In accordance with again a further feature of the invention, the clip-on bridge and the bridge assembly are substantially parallel to one another when the clip-on attachment is mounted on the pair of eyeglasses, and the bores have axes offset from orthogonal to the parallel bridges by an angle of between 1° and 30°. The axes of the bores are adapted and they are inclined towards one another, preferably at angles in the neighborhood of 10° or 15°.

In accordance with a concomitant feature of the invention, the invention is advantageously provided with a pair of eyeglasses that are rimless, i.e., substantially without a frame between the lateral end pieces and the bridge assembly. Placing the substantially rimless clip-ons on these rimless spectacles leads to a particularly pleasing appearance.

The invention is equally applicable to half-frame eyeglasses, i.e., glasses with a frame rim extending between the lateral end pieces and the bridge assembly only along a top of the first and second lenses. In the alternative, the half-frame embodiment may also have the rim connector on the bottom of the lenses.

Finally, the pair of eyeglasses may be full-frame eyeglasses having a frame substantially completely enclosing the first and second lenses.

Other features which are considered as characteristic for the invention are set forth in the appended claims.

Although the invention is illustrated and described herein as embodied in a magnetic auxiliary eyewear clip-on assembly, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWING

FIG. 2 is a partial perspective view of a pair of half-frame eyeglasses and a corresponding magnetic clip-on;

FIG. 3 is a partial perspective view of a pair of full-frame eyeglasses and a corresponding magnetic clip-on;

DESCRIPTION OF THE PREFERRED EMBODIMENTS

Figure 1:
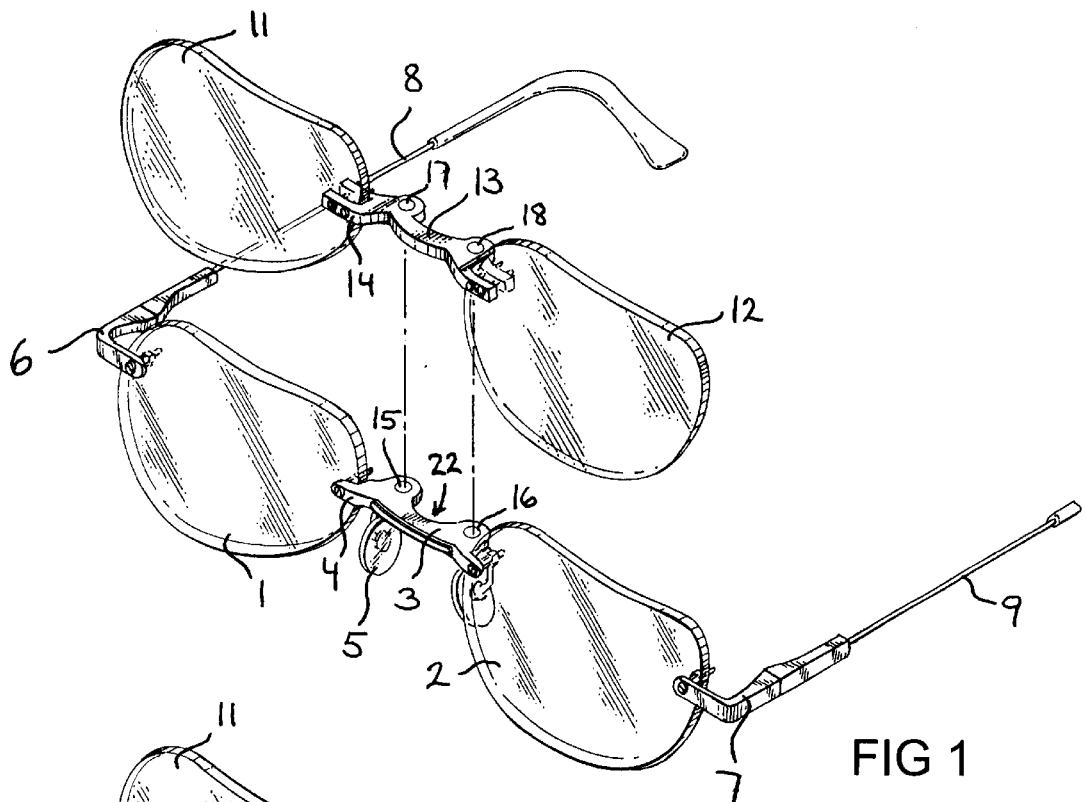
FIG. 1 is a partial perspective view of a pair of frameless eyeglasses and a corresponding clip-on according to the invention.

Referring now to the figures of the drawing in detail and first, particularly, to FIG. 1 thereof, there is seen a rimless (i.e., frameless) pair of eyeglasses with lenses 1 and 2 that are held together by a bridge assembly 3. The bridge assembly 3 has lateral brackets 4 at which the lenses 1 and 2 are attached. In the illustrated embodiment, the lenses 1 and 2 are bolted to the brackets 4. The bridge assembly 3 also carries two nose pads 5 which are attached to respective frame wire stubs that originate from the bridge and project downward. End pieces 6 and 7 are laterally attached to the lenses 1 and 2, respectively. The end pieces 6 and 7 are also bolted to the lenses, similarly to the bridge assembly 3. Temple pieces 8 and 9 are articulated at the end pieces 8 and 9. These elements are conventional and will, therefore, not be described in detail.

Figure 2:
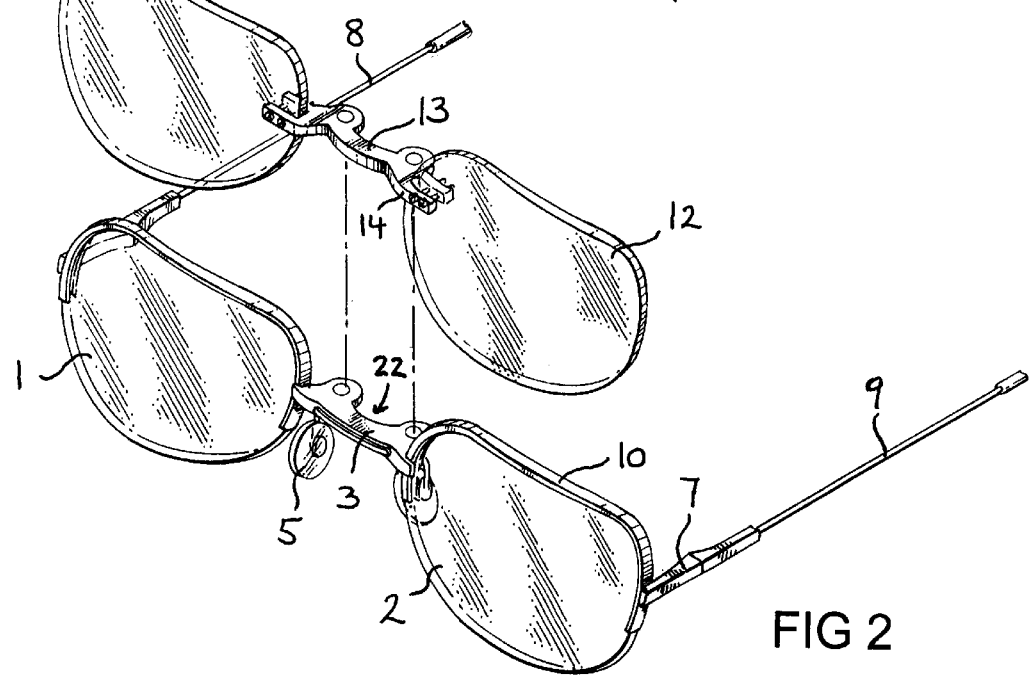

With reference to FIG. 2, which illustrates a half-frame embodiment of the invention, the bridge assembly 3 and the end pieces 6 and 7 are not attached with a bolt, as in FIG. 1, but they are instead connected via a half frame 10. The half frame 10 thereby is a rim segments that extends only from the bridge assembly 3 to the end pieces 6 and 7, respectively, and thus encloses only half of each lens 1 and 2. It will be understood that, in another design, the half frame 10 may be formed in one piece with the bridge 3 and/or the end pieces 6 and 7, or it may be welded or soldered to them.

Figure 3:
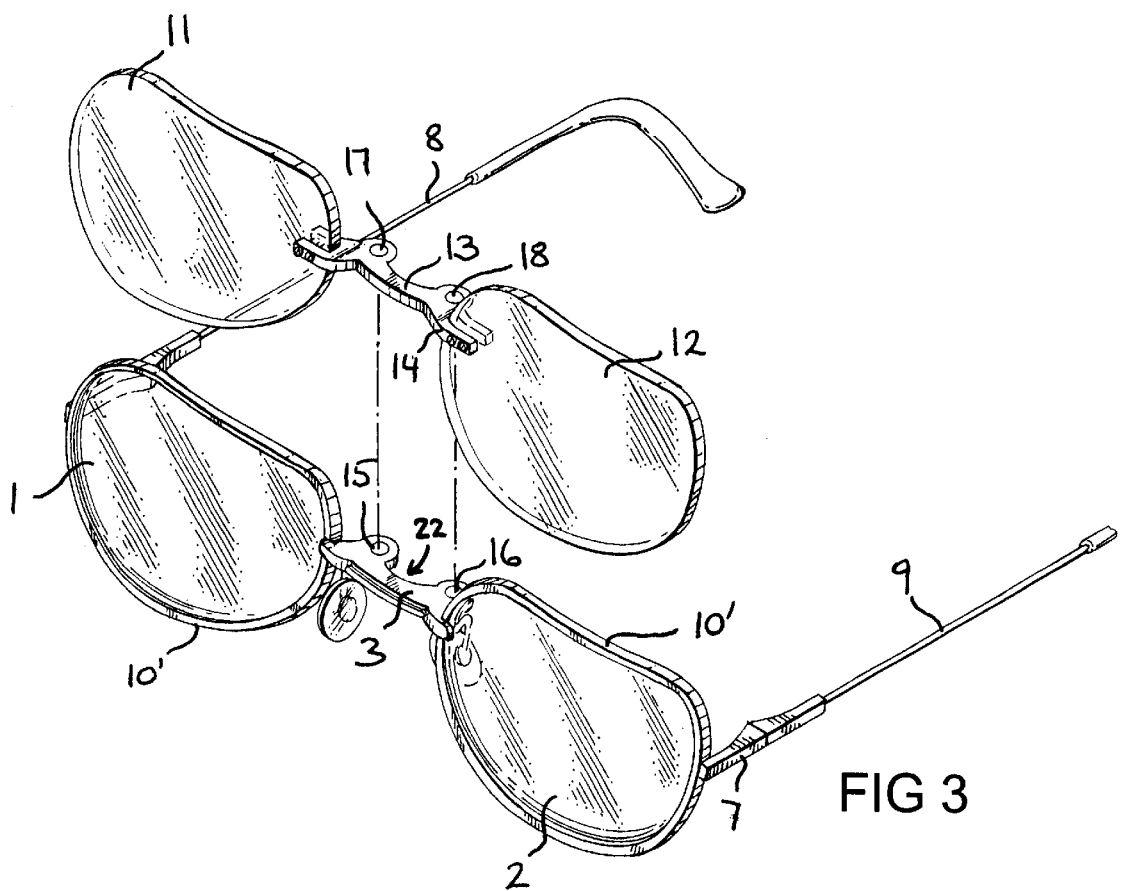

With reference to FIG. 3, which illustrates a full-frame embodiment of the invention, the bridge assembly 3 and the end pieces 6 and 7 are here connected via a full frame 10'. The full frame 10' may also be formed in one piece with the bridge 3 and/or the end pieces 6 and 7, or it may be welded or soldered to them.

Each of FIGS. 1–3 also illustrates a clip-on with two lenses 11 and 12, as well as a clip-on bridge 13. The clip-on bridge 13 is formed with lateral brackets 14. The brackets 14 have a U-shape into which the lenses 11 and 12 are respectively received. The lenses 11 and 12 are attached to the clip-on bridge 13 via two bolts each, which penetrate through two non-illustrated bores formed in each of the lenses 11 and 12. The clip-ons for each of the exemplary eyeglasses, namely the rimless embodiment (FIG. 1), the half-frame embodiment (FIG. 2), and the full-frame embodiment (FIG. 3), are rimless and consist essentially only of the lenses 11, 12, and the bridge 13.

The bridge assembly 3 has two magnets 15 and 16 incorporated in bores formed in the bridge. The clip-on bridge 13 has corresponding magnets 17 and 18. The magnets are aligned with one another, as indicated by the vertical dash-dotted lines, to that the magnets 15 and 17 and the magnets 16 and 18 for respective pairs when the clip-on is placed on the eyeglasses. It is understood, of course, that the magnets must be oriented so as to attract one another, i.e., magnet 15 must attract magnet 17 and magnet 16 must attract magnet 18.

Figure 4:
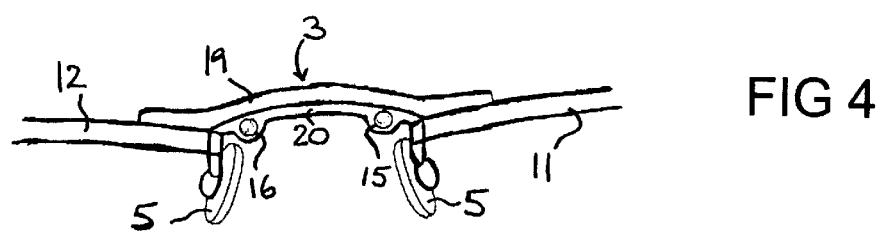
FIG. 4 is a partial top plan view onto the bridge assembly of the rimless pair of eyeglasses illustrated in FIG. 1.

With reference to the slightly modified embodiment shown in FIG. 4, the bridge assembly 3 may be formed of two main element structural elements, namely a frontal element 19 that holds the lenses 11 and 12, and a rear element 20 that houses the magnets 17 and 18.

Figure 5:
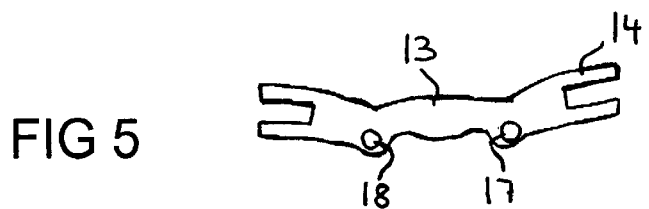
FIG. 5 plan view of the clip-on bridge assembly of each of FIGS. 1, 2, and 3.
Figure 6:
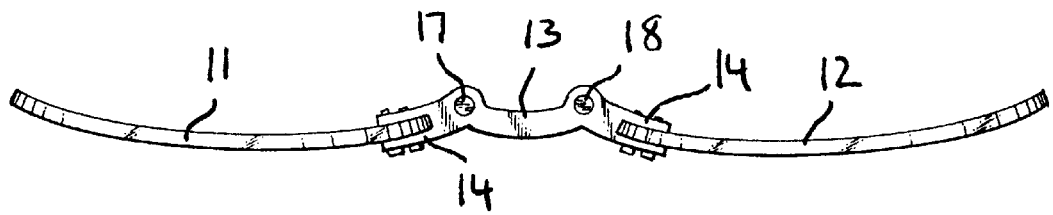
FIG. 6 is a top plan view onto the clip-on attachment according to the invention.
Figure 7:
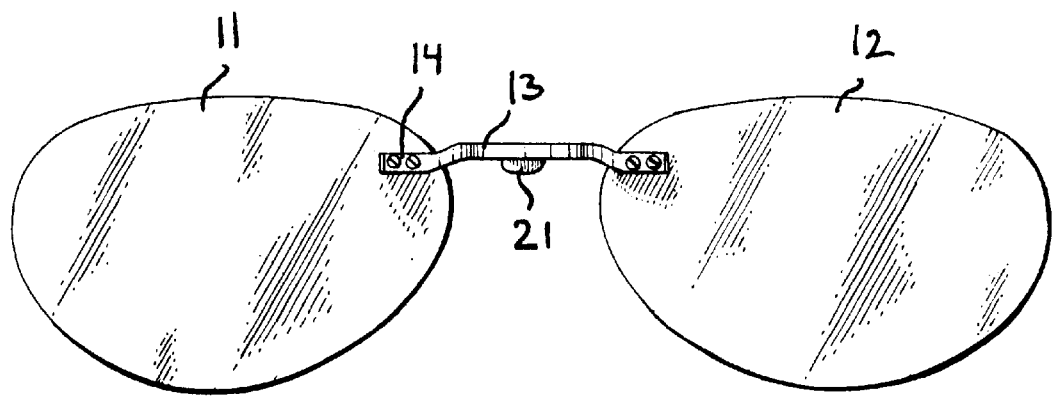
FIG. 7 is a front-elevational view thereof.
Figure 8:
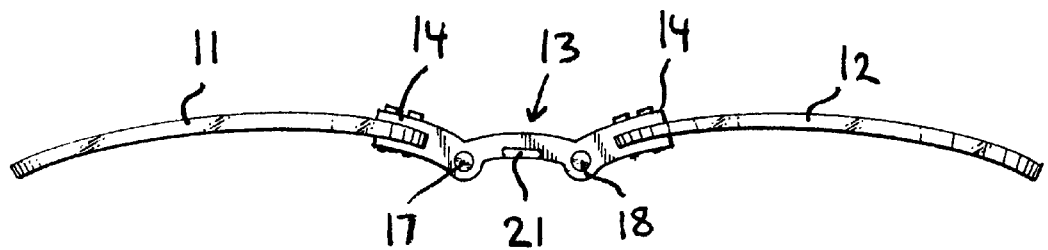
FIG. 8 is a bottom plan view thereof.
Figure 11:
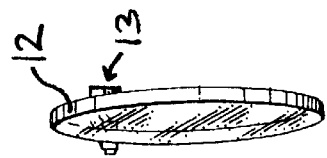
FIG. 11 is a left-side elevational view thereof.
Figure 10:
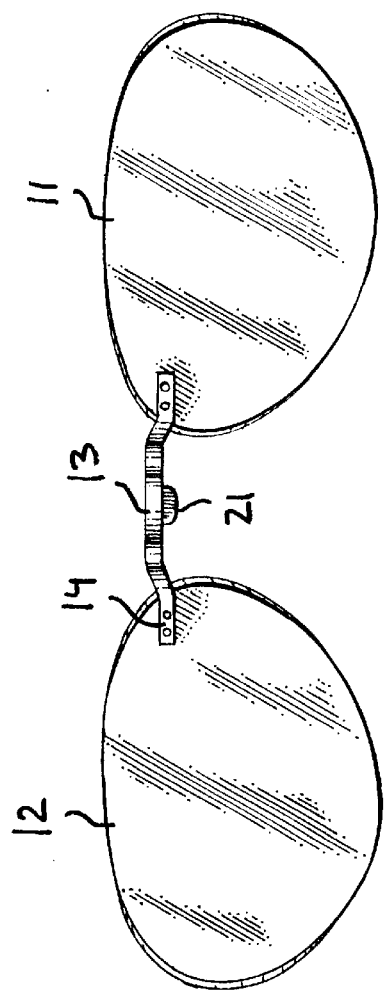
FIG. 10 is a rear elevational view thereof.
Figure 9:
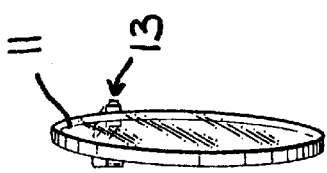
FIG. 9 is a right-side elevational view thereof.

The clip-on bridge 13 is illustrated in FIG. 5. The lateral brackets 14 are formed with a cutout (defining the U of the brackets) having a thickness that corresponds approximately to the thickness of the lenses 11 and 12.

Referring now to FIGS. 6–11, the novel clip-on is illustrated therein from six different viewing angles. It becomes clear from these figures, that the clip-on consists essentially only of the two lenses 11, 12 and the bridge 13, which connects the two lenses 11, 12 and holds them rigidly at a spaced-apart relationship. It will be understood that it is also possible to hinge the bridge 13 so that the clip-on may be folded. The views in FIGS. 6–11, therefore, pertain to the configuration in which the clip-on can be magnetically attached to the eyeglasses.

The bridge 13 is formed with a nose 21 which forms a mechanical lock by engaging the bridge 3. In that regard, when the clip-on is placed into its attachment position on the pair of eyeglasses, the nose 21 reaches down into a recess 22 of the bridge assembly 3. As a result, the clip-on is held in position on the eyeglasses by the magnet pairs 15/17 and 16/18, and by the interlock of the nose 21 in the recess 22.

The magnets 15, 16, 17, and 18 are very compact and they are essentially completely integrated into the respective bridges 3, 13. In a preferred embodiment, the magnets are cylinder platelets with a diameter of 1.5 mm and a depth of 1.0 to 2.0 mm. Such magnets are commercially available, for example, from Goudsmit Magnetic Supplies in Holland. Modern such magnets formed with neodymium (e.g. NdFeB) and zinc coating, exhibit superior remanence and coercivity. It goes without saying that these cylindrical magnets are axially magnetized.

Figure 12:
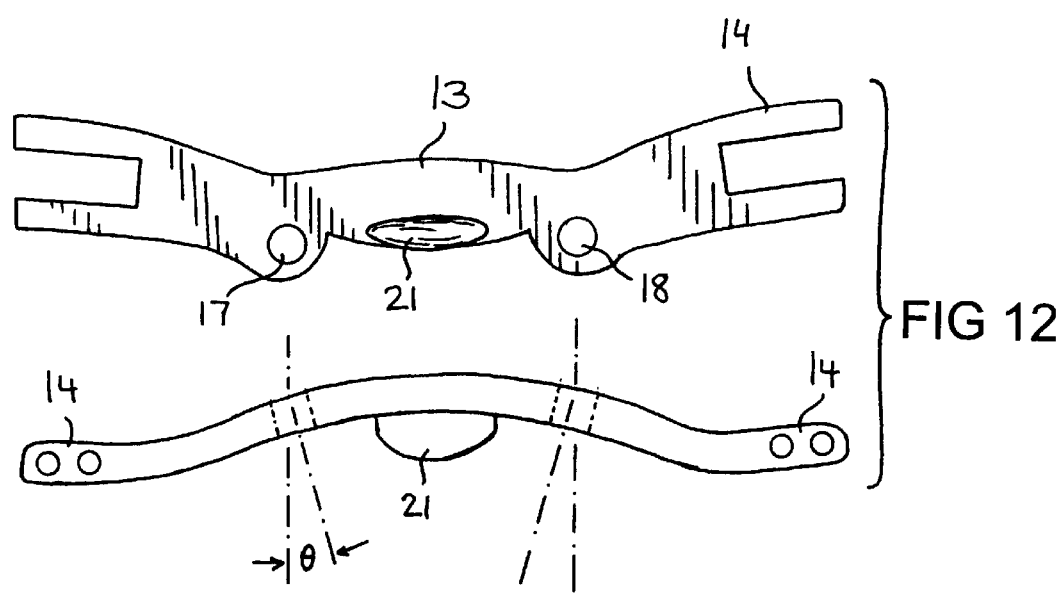
FIG. 12 is a bottom plan view of an embodiment of the clip-on bridge and an elevational view of the clip-on bridge laterally aligned with the plan view.

FIG. 12 illustrates the clip-on bridge 13 in a magnified view in bottom plan and front elevation. The bores into which the magnets 17 and 18 are inserted are inclined towards one another by an angle $2\theta$, i.e., each axis is inclined relative to vertical (when the bridge is in a horizontal orientation) by the angle $\theta$. The angle, depending on the specific requirements, may be aligned to amount from 1° to 30°. Preferred embodiments have the angle $\theta$ at 10° and 15° respectively.

What is claimed is:

1. In combination with a pair of eyeglasses having a bridge assembly, a magnetic clip-on attachment, comprising:

first and second lenses;

a clip-on bridge connecting and rigidly holding said first and second lenses in a spaced-apart relationship substantially without a frame, said clip-on bridge being formed with two U-shaped lateral brackets each for receiving a respective one of said first and second lenses; and a magnet disposed to magnetically attach said clip-on bridge to the bridge assembly of the pair of eyeglasses.

2. The magnetic clip-on attachment according to claim 1, wherein said magnet is one of two magnets disposed and magnetically aligned in said clip-on bridge to be aligned with and magnetically attracted to two magnets disposed in the bridge assembly of the pair of eyeglasses.

3. The magnetic clip-on attachment according to claim 2, wherein said clip-on bridge is formed with two cylindrical bores and said magnets are cylindrical magnets disposed in said bores.

4. The magnetic clip-on attachment according to claim 3, wherein said bores have mutually non-parallel axes.

5. The magnetic clip-on attachment according to claim 3, wherein said clip-on bridge is generally aligned horizontally upon being placed on the bridge assembly of the pair of eyeglasses, and said bores have axes offset from vertical by an angle of between 1° and 30°.

6. The magnetic clip-on attachment according to claim 3, wherein said axes are inclined towards one another by an angle of 10° to 15°.

7. An eyewear article, comprising:

a pair of eyeglasses having first and second lenses, a bridge assembly between said optical lenses, and temple pieces laterally attached to said lenses respectively opposite from said bridge assembly;

a magnetic clip-on attachment having first and second clip-on lenses, a clip-on bridge connecting said first and second clip-on lenses in a spaced-apart relationship substantially without a frame, said clip-on bridge being formed with two U-shaped lateral brackets each for receiving a respective one of said first and second lenses; and magnet devices respectively disposed to magnetically attach said clip-on bridge to said bridge assembly of said pair of eyeglasses and to thereby hold said first and second clip-on lenses in a congruent covering relationship with said first and second lenses, respectively, of said pair of eyeglasses.

8. The eyewear article according to claim 7, wherein said magnet devices comprise first and second magnets in said clip-on bridge and first and second magnets in said bridge assembly of said pair of eyeglasses, and wherein said first magnets and said second magnets are aligned and magnetically attracted to one another to form pairs of magnets holding said clip-on bridge on said bridge assembly of said pair of eyeglasses.

9. The eyewear article according to claim 8, wherein said clip-on bridge is formed with two cylindrical bores and said first and second magnets are cylindrical magnets disposed in said bores.

10. The eyewear article according to claim 9, wherein said bores have mutually non-parallel axes.

11. The eyewear article according to claim 9, wherein said clip-on bridge and said bridge assembly are substantially parallel to one another when said clip-on attachment is mounted on said pair of eyeglasses, and said bores have axes offset from orthogonal to said parallel bridges by an angle of between 1° and 30°.

12. The eyewear article according to claim 11, wherein said axes are inclined towards one another by an angle of 10° to 15°.

13. The eyewear article according to claim 7, wherein said pair of eyeglasses a re rimless eyeglasses substantially without a frame between said lateral end pieces and said bridge assembly.

14. The eyewear article according to claim 7, wherein said pair of eyeglasses are half-frame eyeglasses having a frame rim extending between said lateral end pieces and said bridge assembly only along a top of said first and second lenses.

* * * * *